United States Patent
Yamashiro

(10) Patent No.: US 9,156,495 B2
(45) Date of Patent: Oct. 13, 2015

(54) DRIVING SUPPORT DEVICE AND DRIVING SUPPORT SYSTEM

(71) Applicant: DENSO CORPORATION, Kariya, Aichi-pref. (JP)

(72) Inventor: Takahisa Yamashiro, Chiryu (JP)

(73) Assignee: DENSO CORPORATION, Kariya (JP)

( * ) Notice: Subject to any disclaimer, the term of this patent is extended or adjusted under 35 U.S.C. 154(b) by 23 days.

(21) Appl. No.: 14/065,552

(22) Filed: Oct. 29, 2013

(65) Prior Publication Data

US 2014/0131977 A1  May 15, 2014

(30) Foreign Application Priority Data

Nov. 13, 2012 (JP) ................................ 2012-249577

(51) Int. Cl.
| | | |
|---|---|---|
| *B60R 1/00* | (2006.01) | |
| *B62D 12/00* | (2006.01) | |
| *B62D 12/02* | (2006.01) | |
| *B60W 30/14* | (2006.01) | |

(52) U.S. Cl.
CPC ................ *B62D 12/00* (2013.01); *B62D 12/02* (2013.01); *B60W 30/14* (2013.01)

(58) Field of Classification Search
CPC ............ B60D 1/481; B60D 1/64; B60D 1/36; B60R 1/002; B60R 1/003; B60S 13/00; B62D 49/0692; B62D 49/08; B62D 12/00; B62D 12/02
See application file for complete search history.

(56) References Cited

U.S. PATENT DOCUMENTS

| | | | | |
|---|---|---|---|---|
| 3,815,939 | A * | 6/1974 | Pettay | 280/474 |
| 4,397,474 | A * | 8/1983 | Mettetal | 280/476.1 |
| 5,274,432 | A * | 12/1993 | Parent | 356/138 |
| 7,425,889 | B2 * | 9/2008 | Widmann et al. | 340/438 |
| 8,519,836 | B2 * | 8/2013 | Grossman | 340/426.1 |
| 2008/0177435 | A1 * | 7/2008 | Caporali et al. | 701/23 |
| 2009/0219148 | A1 * | 9/2009 | Thomas et al. | 340/431 |
| 2010/0324770 | A1 * | 12/2010 | Ramsey et al. | 701/25 |
| 2011/0049836 | A1 * | 3/2011 | Weber et al. | 280/400 |
| 2012/0109471 | A1 * | 5/2012 | Wu | 701/49 |
| 2012/0182139 | A1 * | 7/2012 | Raines | 340/431 |
| 2012/0235834 | A1 * | 9/2012 | Grossman | 340/988 |
| 2014/0085472 | A1 * | 3/2014 | Lu et al. | 348/148 |

FOREIGN PATENT DOCUMENTS

| | | |
|---|---|---|
| CA | 1175868 A1 * | 10/1984 |
| JP | 2006-027343 | 2/2006 |

\* cited by examiner

*Primary Examiner* — Rodney Butler
(74) *Attorney, Agent, or Firm* — Harness, Dickey & Pierce, PLC

(57) ABSTRACT

A driving support device for a first trailer coupling vehicle including a first trailer and a first towing vehicle includes: a leading vehicle driving status obtaining device for obtaining a driving status of a second trailer coupling vehicle; a first towing vehicle driving status obtaining device for successively obtaining a driving status of the first towing vehicle; a first trailer driving status obtaining device for successively obtaining a driving status of the first trailer; and a support device for supporting a driver of the first trailer coupling vehicle so as to bring the driving status of the first towing vehicle and the driving status of the first trailer closer to the driving status of a second towing vehicle and the driving status of a second trailer, respectively, when the first trailer coupling vehicle changes in direction.

8 Claims, 12 Drawing Sheets

DRIVING SUPPORT DEVICE AND DRIVING SUPPORT SYSTEM

CROSS REFERENCE TO RELATED APPLICATION

This application is based on Japanese Patent Application No. 2012-249577 filed on Nov. 13, 2012, the disclosure of which is incorporated herein by reference.

TECHNICAL FIELD

The present disclosure relates to a driving support device for supporting a driver of a vehicle towing a trailer to change a direction and a driving support system having the driving support device.

BACKGROUND

Conventionally, a technique for supporting a driver of a vehicle towing a trailer to change a direction is well known. For example, JP-A-2006-27343 teaches a vehicular device for determining, whether it is possible for the vehicle with the trailer to change in direction at a next corner on a road ahead, according to a road shape stored in a map data of a navigation device and a minimum turning radius of the vehicle with the trailer, which is preliminary set. Further, the vehicular device outputs warning to the driver when it is impossible to change in direction at the next corner. Further, when it is impossible to change in direction at the next corner, the vehicular device warns the driver, and outputs a warning message to the driver in order to prompt the driver to change in direction at the corner with a large turning radius of the towing vehicle.

However, the technique disclosed in JP-A-2006-27343 merely outputs the warning information before changing in direction at the next corner. Accordingly, if the vehicle and/or the trailer run over a road region (i.e., a driving allowance region), which is allowed for the driver to run through after the driver starts to change in direction at the next corner, it is difficult to support the driver to restrict the running over, i.e., it is difficult to avoid to drive along an outside of the driving allowance region.

It is considered that a driving support device restricts to run over the driving allowance region by supporting the driver to drive the towing vehicle with the trailer along a stored trajectory of a towing vehicle based on stored information. The stored trajectory in the stored information is previously obtained from the towing vehicle, which does change in direction at the corner without running over the driving allowance region.

However, even if the behavior of the towing vehicle is the same, the behavior of the trailer may be different when the load of the trailer is different. Thus, even if the driving support device supports the driver in the above manner, the vehicle with the trailer may run over the driving allowance region while the vehicle change in direction at the corner.

SUMMARY

It is an object of the present disclosure to provide a driving support device and a driving support system having the driving support device for supporting a driver of a towing vehicle with a trailer to restrict the vehicle from running over a driving allowance region when the vehicle changes in direction at a corner.

According to a first aspect of the present disclosure, a driving support device for a first trailer coupling vehicle including a first trailer and a first towing vehicle, the driving support device includes: a leading vehicle driving status obtaining device for obtaining a driving status of a second trailer coupling vehicle via wireless communication, the driving status of the second trailer coupling vehicle indicating at least one of a behavior and a travelling point of each of a second towing vehicle and a second trailer of the second trailer coupling vehicle, which is a leading vehicle of the first trailer coupling vehicle so that the second trailer coupling vehicle has changed in direction on a road ahead of the first trailer coupling vehicle; a first towing vehicle driving status obtaining device for successively obtaining a driving status of the first towing vehicle; a first trailer driving status obtaining device for successively obtaining a driving status of the first trailer; and a support device for supporting a driver of the first trailer coupling vehicle to drive the first towing vehicle so as to bring the driving status of the first towing vehicle and the driving status of the first trailer closer to the driving status of the second towing vehicle and the driving status of the second trailer, respectively, when the first trailer coupling vehicle changes in direction.

The above driving support device supports the driver to drive the first towing vehicle so as to bring the driving status of the first towing vehicle and the driving status of the first trailer closer to the driving status of the second towing vehicle and the driving status of the second trailer, respectively. Thus, even if the carrying load of the first trailer is different from the second trailer, the first trailer towing vehicle can change in direction along the trajectory similar to the leading vehicle. Since the driving status of the second trailer towing vehicle, which has changed in direction without running over the driving allowance region, the first trailer towing vehicle can also change in direction without running over the driving allowance region. As a result, when the driving support device supports the driver to drive the towing vehicle, it is possible for the first trailer towing vehicle not to run over the driving allowance region while the first trailer towing vehicle changes in direction.

According to a second aspect of the present disclosure, a driving support system includes: the driving support device according to the first aspect of the present disclosure; and a second vehicle side communication device arranged at the second trailer coupling vehicle. The second vehicle side communication device includes: a second towing vehicle driving status obtaining device for successively obtaining a driving status of the second towing vehicle; a second trailer driving status obtaining device for successively obtaining a driving status of the second trailer; and a second vehicle side transmission device. The second trailer coupling vehicle has changed in direction on the road ahead of the first trailer coupling vehicle without running over a driving allowance region of the road. The second trailer coupling vehicle is allowed to travel in the driving allowance region of the road. The driving status of the second towing vehicle includes at least one of the behavior and the travelling point of the second towing vehicle while the second towing vehicle changes in direction. The second vehicle side transmission device transmits the driving status of the second towing vehicle and the driving status of the second trailer via wireless communication.

In the above driving support system, even if the carrying load of the first trailer is different from the second trailer, the first trailer towing vehicle can change in direction along the trajectory similar to the leading vehicle. Since the driving status of the second trailer towing vehicle, which has changed in direction without running over the driving allowance region, the first trailer towing vehicle can also change in direction without running over the driving allowance region. As a result, when the driving support system supports the driver to drive the towing vehicle, it is possible for the first trailer towing vehicle not to run over the driving allowance region while the first trailer towing vehicle changes in direction.

According to a third aspect of the present disclosure, a driving support device for a trailer coupling vehicle including a trailer and a towing vehicle, the driving support device includes: a recommended ideal trajectory obtaining device for obtaining a recommended ideal trajectory from a road side device arranged at an intersection via wireless communication, the recommended ideal trajectory recommending an ideal travelling point of each of the trailer and the towing vehicle when the trailer coupling vehicle turns right or left at the intersection on a road ahead of the trailer coupling vehicle without running over a driving allowance region of the road, and the trailer coupling vehicle being allowed to travel in the driving allowance region of the road; a towing vehicle driving status obtaining device for successively obtaining a travelling point of the towing vehicle; a trailer driving status obtaining device for successively obtaining a travelling point of the trailer; and a support device for supporting a driver of the trailer coupling vehicle to turn right or left at the intersection so as to bring the travelling point of the towing vehicle and the travelling point of the trailer closer to the ideal travelling point of the towing vehicle and the ideal travelling point of the trailer, respectively, when the trailer coupling vehicle turns right or left at the intersection.

The above driving support device supports the driver to drive the trailer towing vehicle so as to bring the travelling point of the towing vehicle and the travelling point of the trailer closer to the ideal travelling point of the towing vehicle and the ideal travelling point of the trailer, respectively. Thus, the trailer towing vehicle can turn right or left at the intersection without running over the driving allowance region. As a result, when the driving support system supports the driver to drive the towing vehicle, it is possible for the trailer towing vehicle not to run over the driving allowance region while the trailer towing vehicle changes in direction.

According to a fourth aspect of the present disclosure, a driving support system includes: the driving support device according to the third aspect of the present disclosure, and the road side device for transmitting the recommended ideal trajectory via the wireless communication.

The above driving support system supports the driver to drive the trailer towing vehicle so as to bring the travelling point of the towing vehicle and the travelling point of the trailer closer to the ideal travelling point of the towing vehicle and the ideal travelling point of the trailer, respectively. Thus, the trailer towing vehicle can turn right or left at the intersection without running over the driving allowance region. As a result, when the driving support system supports the driver to drive the towing vehicle, it is possible for the trailer towing vehicle not to run over the driving allowance region while the trailer towing vehicle changes in direction.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

The embodiments of the present disclosure will be explained with reference to the drawings. In the below described embodiments, a driving support system corresponds to a left-hand traffic rule. When the driving support system corresponds to a right-hand traffic rule, right and left are reversed.

(First Embodiment)

Figure 1:
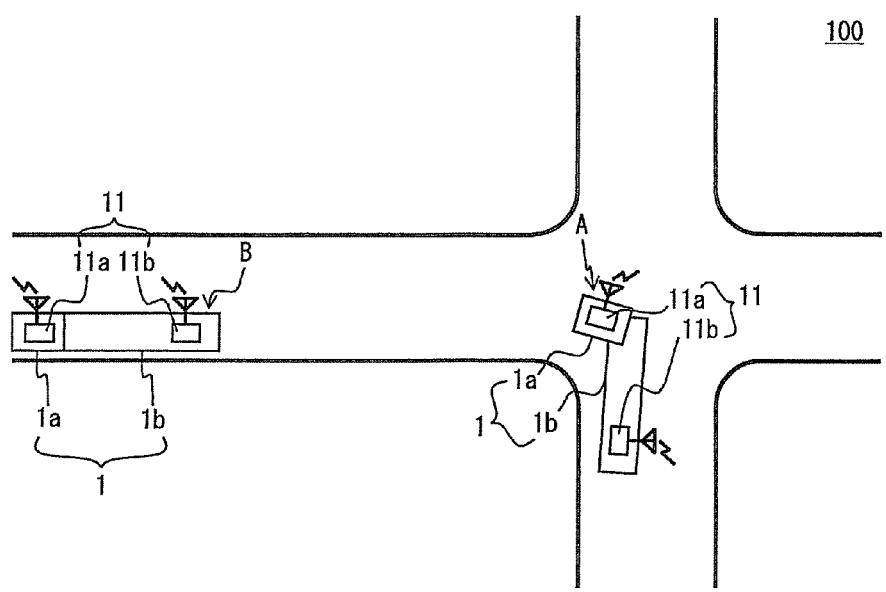
FIG. 1 is a diagram showing a driving support system.

As shown in FIG. 1, a driving support system 100 includes multiple driving support devices 11, each of which is mounted on a respective towing vehicle 1 with a trailer (i.e., a trailer coupling vehicle). Here, the vehicles 1 include a first vehicle (i.e., a subject vehicle) A and a second vehicle (a leading vehicle) B, for example. The second vehicle B is a towing vehicle 1 with towing a trailer and runs ahead of the vehicle A along a road, on which the vehicles A and B are disposed. The vehicle A is another towing vehicle with towing another trailer, which follows the vehicle B.

In the first embodiment, a skillful driver drives the towing vehicle B, so that the vehicle changes in direction without running over a driving allowance region. The driving allowance region includes a whole of traffic lanes (i.e., driving allowance lanes before changing in direction) in the same travelling direction as a traffic lane, on which the vehicle runs before the vehicle changes in direction, and a whole of traffic lanes (i.e., driving allowance lanes after changing in direction) in the same travelling direction as a traffic lane, on which the vehicle runs after the vehicle changes in direction.

The driving allowance region at the intersection includes a whole area of a road region in the intersection other than a road side strip. Alternatively, the driving allowance region at the intersection may include a whole area of the road region in the intersection including the road side strip. The driving allowance lanes before changing in direction (i.e., before changing driving allowance lanes) and the driving allowance lanes after changing in direction (i.e., after changing driving allowance lanes) may include a road side strip.

The towing vehicle 1 together with the trailer includes a towing vehicle 1a having a driver seat and a trailer 1b having a load bed or a passenger carriage. The towing vehicle 1a is connectable to and disconnectable from the trailer 1b via a connecting device. The connecting device is, for example, a conventional coupler and a king pin. The towing vehicle 1a may be a tractor, and the trailer 1b may be a towed vehicle. The trailer coupling vehicle may be a semi trailer, a full-trailer, a pole trailer or the like.

The driving support device 11 includes a towing vehicle side communication device 11a and a trailer side communication device (i.e., a towed vehicle side communication device) 11b. The towing vehicle side communication device 11a is mounted on the towing vehicle 1a, and the trailer side communication device 11b is mounted on the trailer 1b. The driving support device 11 mounted on the first vehicle A corresponds to a subject driving support device. The driving support device 11 mounted on the second vehicle B corresponds to a leading vehicle communication device.

Figure 2:
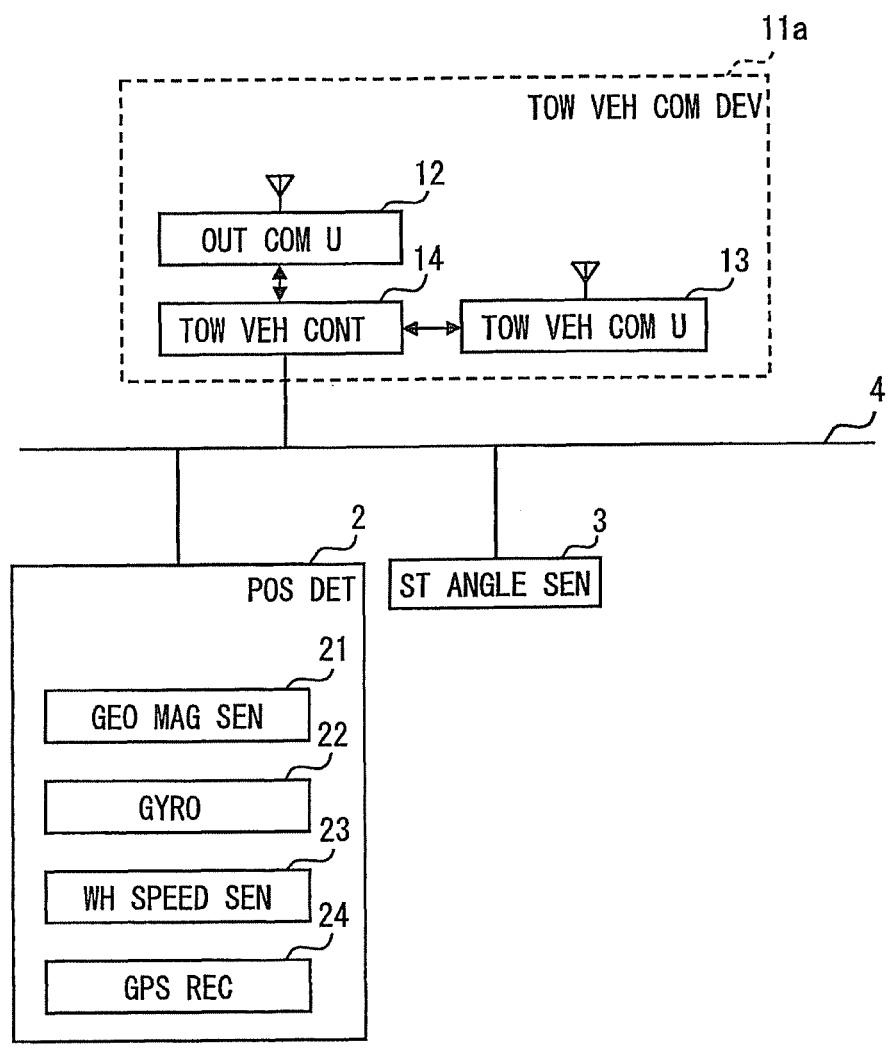
FIG. 2 is a block diagram showing a towing vehicle side communication device.

Here, a general constitution of the towing vehicle side communication device 11a will be explained with reference to FIG. 2. FIG. 2 shows the towing vehicle side communication device 11a. As shown in FIG. 2, the towing vehicle side communication device 11a includes an outside communication unit 12, a towing vehicle side communication unit 13, and a towing vehicle side controller 14.

The towing vehicle side communication device 11a is connected to the position detector 2 and the steering wheel angle sensor 3 so as to transmit and receive a signal (i.e., information). In the present embodiment, the towing vehicle side communication device 11a, the position detector 2 and the steering wheel angle sensor 3 are connected to each other via an in-vehicle LAN 4, which conforms to a communication protocol such as a CAN (controller area network).

The position detector 2 successively detects a position (i.e., a towing vehicle position) of the towing vehicle is according to information obtained from various sensors such as the geo-magnetic sensor 21 for detecting geo magnetism, a gyroscope 22 for detecting an angular speed of the vehicle 1a around a vertical direction, a wheel speed sensor 23 for detecting a vehicle speed of the towing vehicle 1a based on a rotation speed of a rolling wheel of the towing vehicle 1a and a GPS receiver 24 for a GPS (grovel positioning system) that detects a position of the towing vehicle is based on an electric wave from a satellite. The towing vehicle position may be defined as coordinates (i.e., latitude and longitude).

Here, the GPS receiver 24 is attached to a part of the vehicle 1a, which is disposed over a center of a rear wheel axle of the towing vehicle 1a, for example. The coordinates of the center of the rear wheel axle in the towing vehicle 1a defines the towing vehicle position. The geo magnetic sensor 21, the gyroscope 22 and the wheel speed sensor 23 are attached to the towing vehicle 1a.

The above sensors have errors with different characteristics, respectively. Thus, the errors are compensated to each other with using information from various sensors. Here, the position detector 2 may include only a part of elements shown in FIG. 2. Alternatively, the position detector 2 may include another element, which is not shown in FIG. 2.

The steering wheel angle sensor 3 detects a steering wheel angle of the vehicle 1a. The steering wheel angle is defined as zero degree, i.e., a neutral position when the vehicle goes straight. A rotation angle from the neutral position is defined as the steering wheel angle. Thus, the sensor 3 outputs a signal corresponding to the steering wheel angle. Here, the sign of the steering wheel angle is positive when the steering wheel rotates to a right side from the neutral position. The sign of the steering wheel angle is negative when the steering wheel rotates to a left side from the neutral position.

The outside communication unit 12 in the towing vehicle side communication device 11a includes a transmitting and receiving antenna so that the unit 12 transmits and receives information in a wireless communication manner without a telephone line network between the towing vehicle 1a and other vehicles around the towing vehicle 1a. Thus, the unit 12 provides vehicle-to-vehicle communication (i.e., inter-vehicle communication).

For example, when the wireless communication is performed with using the electric wave in 700 MHz band, the inter-vehicle communication is performed between the subject vehicle and other vehicles, which are disposed within a radius of 1 kilometer around the subject vehicle as a center of a circle. When the wireless communication is performed with using the electric wave in 5.9 GHz band, the inter-vehicle communication is performed between the subject vehicle and other vehicles, which are disposed within a radius of 500 meters around the subject vehicle as a center of a circle.

The outside communication unit 12 transmits information according to an instruction of the towing vehicle side controller 14. The outside communication unit 12 receives information transmitted from an outside communication unit 12 of a towing vehicle side communication device 11a of another vehicle. Further, the outside communication unit 12 inputs the information into the towing vehicle side controller 14 of the subject vehicle 1a.

The towing vehicle side communication unit 13 of the towing vehicle side communication device 11a includes a transmitting/receiving antenna so that the communication unit 13 wirelessly and directly communicates with the trailer side communication device 11b of the trailer 1b, which is towed by the subject towing vehicle 1a. Specifically, the towing vehicle side communication unit 13 of the subject towing vehicle is performs a short range wireless communication with the trailer side communication unit 12 of the trailer side communication device 11b of the subject trailer 1b, which is towed by the subject towing vehicle 1a, with using a band different from the outside communication unit 12. The short range wireless communication has a communication range of, for example, a few tens meters. The towing vehicle side communication unit 13 performs the short range wireless communication according to a short range wireless communication protocol such as a Bluetooth (that is a registered trademark) and a ZigBee (that is a registered trademark).

The towing vehicle side communication unit 13 of the subject towing vehicle 1a transmits information to the trailer side communication unit 15 of the subject trailer 1b according to the instruction of the towing vehicle side controller 14 of the subject towing vehicle 1a. Further, the towing vehicle side communication unit 13 receives the information transmitted from the trailer side communication unit 15 of the subject trailer 1b, so that the unit 13 inputs the information into the towing vehicle side controller 14 of the subject towing vehicle 1a.

The towing vehicle side controller 14 of the towing vehicle side communication device 11a is provided by a conventional computer, which includes a CPU, a memory such as a ROM, a RAM and an EEPROM, an I/O, and a bus line for connecting among them.

The towing vehicle side controller 14 executes various control programs stored in the ROM according to various information input from the outside communication unit 12, the towing vehicle side communication unit 13, the position detector 2 and the steering wheel angle sensor 3. Thus, the controller 14 performs various processes such as a process (towing vehicle driving status transmission process) for transmitting information about the driving status of the subject towing vehicle 1a and the subject trailer 1b via the inter-vehicle communication, and a process (change direction support process) relating to the support of the driver for changing in direction according to the driving status of the leading vehicle.

The towing vehicle driving status transmission process is performed in the towing vehicle side communication device 11a of the object vehicle B, and the change direction support process is performed in the towing vehicle side communication device 11a of the subject vehicle A. The towing vehicle driving status transmission process and the change direction support process will be explained later.

Figure 3:
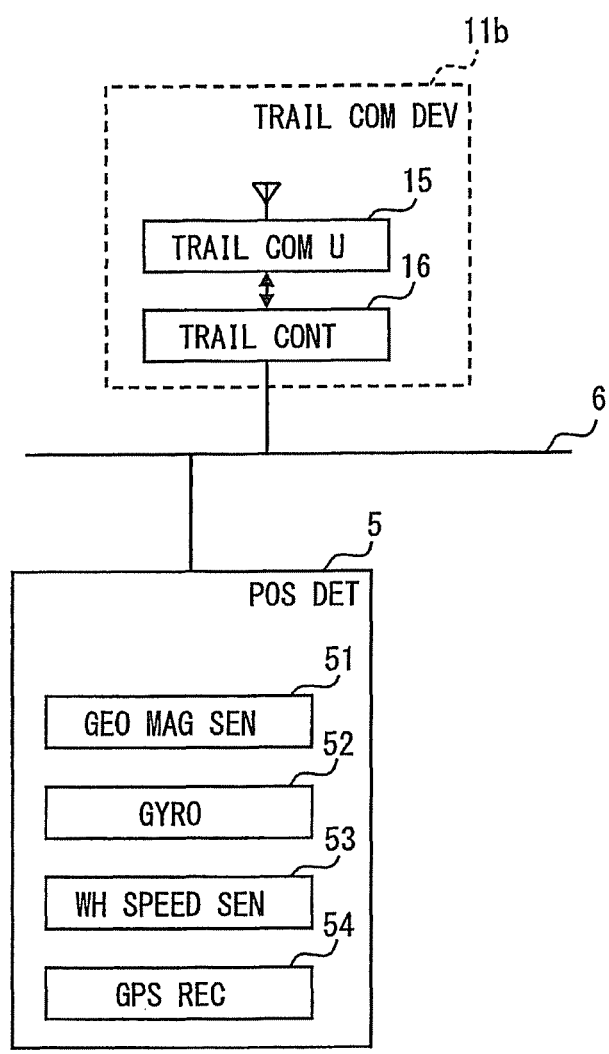
FIG. 3 is a block diagram showing a trailer side communication device.

Here, a construction of the trailer side communication device 11b will be explained with reference to FIG. 3. FIG. 3 shows the trailer side communication device 11b. As shown in FIG. 3, the trailer side communication device 11b includes the trailer side communication unit 15 and the trailer side controller 16.

The trailer side communication device 11b is connectable with the position detector 5 so that the device 11b transmits and receives signal as information with the position detector 5. In the present embodiment, for example, the trailer side communication device 11b and the position detector 5 are connected to each other via the in-vehicle LAN 6, which is conformed to a communication protocol such as a CAN (controller area network).

The towing vehicle 1a may be disconnected from the trailer 1b. Thus, the in-vehicle LAN 6 is an independent network from the in-vehicle LAN 4. The trailer side in-vehicle LAN 6 and the towing vehicle side in-vehicle LAN 4 may be connected to each other via a gateway ECU when the gateway ECU for connecting between the LANs 4, 6 wirelessly is disposed in the vehicle. Alternatively, the trailer side communication device 11b may be connected to the position detector 5 via a direct line.

The position detector 5 successively detects a position (a trailer position) of the trailer 1b based on information obtained from various sensors such as the geo-magnetic sensor 51 for detecting geo magnetism, a gyroscope 52 for detecting an angular speed of the trailer 1b around a vertical direction, a wheel speed sensor 53 for detecting a vehicle speed of the trailer 1b based on a rotation speed of a rolling wheel of the trailer 1b and a GPS receiver 54 for a GPS (grovel positioning system) that detects a position of the trailer 1b based on an electric wave from a satellite. The trailer position may be defined as coordinates (i.e., latitude and longitude).

Here, the GPS receiver 54 is attached to a part of the trailer 1b, which is disposed over a center of a backmost wheel axle of the trailer 1b, for example. The coordinates of the center of the backmost wheel axle in the trailer 1b defines the trailer position. The geo magnetic sensor 51, the gyroscope 52 and the wheel speed sensor 53 are attached to the trailer 1b. Similar to the position detector 2, the position detector 5 may include only a part of elements shown in FIG. 3. Alternatively, the position detector 5 may include another element, which is not shown in FIG. 3.

In the present embodiment, a receiver for the satellite positioning system is the GPS receiver 24, 54 for the GPS. Alternatively, the receiver for the satellite positioning system may be another receiver.

The trailer side communication unit 15 of the trailer side communication device 11b includes a transmitting/receiving antenna so that the communication unit 15 wirelessly and directly communicates with the towing vehicle side communication device 11a of the subject towing vehicle 1a, which tows the subject trailer 1b. Specifically, the trailer side communication unit 15 of the subject trailer 1b performs a short range wireless communication with the towing vehicle side communication unit 13 of the towing vehicle side communication device 11a of the subject towing vehicle 1a, which tows the subject trailer 1b.

The trailer side communication unit 15 of the subject trailer 1b transmits information to the towing vehicle side communication unit 13 of the subject towing vehicle 1a according to the instruction of the trailer side controller 16 of the subject trailer 1b. Further, the trailer side communication unit 15 receives the information transmitted from the towing vehicle side communication unit 13 of the subject towing vehicle 1a, so that the unit 15 inputs the information into the trailer side controller 16 of the subject trailer 1b.

The transmitting power of the transmitting/receiving antenna in the trailer side communication unit 15 may be set to a value, which is estimated as a minimum necessary value (minimum requirement value) for receiving the information by the towing vehicle side communication unit 13 of the subject towing vehicle 1a. For example, the minimum requirement value may be a value for providing a minimum electric field strength when the towing vehicle 1a and the trailer 1b goes straight, and the communication is performed in a distance between the transmitting/receiving antenna of the trailer side communication unit 15 and the transmitting/receiving antenna of the towing vehicle side communication unit 13.

In the above case, an interference of the communication between the subject towing vehicle 1a and the subject trailer 1b to other wireless communications such as inter-vehicle communications around the subject vehicle 1 is restricted. Further, the transmitting power of the transmitting/receiving antenna of the towing vehicle side communication unit 13 may be set to a value, which is estimated as a minimum necessary value (minimum requirement value) for receiving the information by the trailer side communication unit 15 of the subject trailer 1b.

The trailer side controller 16 of the trailer side communication device 11b is provided by a conventional computer, which includes a CPU, a memory such as a ROM, a RAM and an EEPROM, an I/O, and a bus line for connecting among them.

The trailer side controller 16 executes various control programs stored in the ROM according to various information input from the trailer side communication unit 15, and the position detector 5. Thus, the controller 16 performs various processes such as a process (trailer driving status transmission process) for transmitting information about the driving status of the subject trailer 1b to the towing vehicle side communication device 11a of the subject towing vehicle 1a. The trailer driving status transmission process is performed in the trailer side communication device 11b of the object vehicle B and the trailer side communication device 11b of the subject vehicle A.

Figure 4:
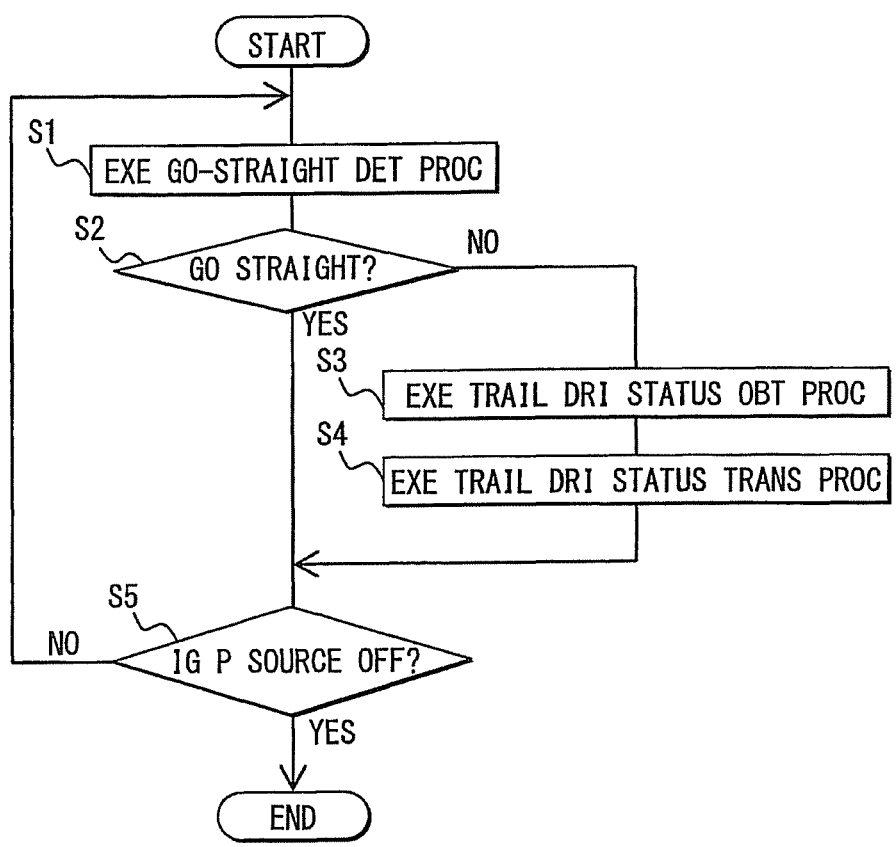
FIG. 4 is a flowchart showing a trailer side driving status transmission process executed in a trailer side controller.

Here, the trailer driving status transmission process in the trail side controller 16 of the trail side communication device 11b at each of the subject vehicle A and the object vehicle B with reference to FIG. 4. The controller 16 starts to execute the flowchart of FIG. 4 when the ignition power source of a respective vehicle A, B turns on.

At step S1, the controller 16 executes the go-straight determination process. In the go-straight determination process, the controller 16 determines whether the respective vehicle goes straight. Thus, the go-straight determination process at steps S1 corresponds to the go-straight determination device.

The controller determines whether the vehicle goes straight, according to the following manner.

The detected steering wheel angle transmitted from the towing vehicle side communication unit 13 in the towing vehicle side communication device 11a at the respective vehicle is obtained by the controller 16 via the trailer side communication unit 15. The steering wheel angle successively detected by the steering wheel angle sensor 3 is transmitted by the towing vehicle side communication device 11a via the towing vehicle side communication unit 13. When the obtained steering wheel angle is disposed in a threshold range from the neutral position, the controller 16 determines that the vehicle goes straight. Here, the threshold range may be settable appropriately, and defined by a positive predetermined steering wheel angle and a negative predetermined steering wheel angle.

At step S2, when the controller 16 determines that the vehicle goes straight, i.e., the determination at step S2 is "YES," it goes to step S5 without executing to transmit the driving status of the trailer 1b. When the vehicle goes straight, it is not necessary to support the driver to change in direction. Thus, it is not necessary to transmit the driving status of the trailer 1b to the towing vehicle side communication device 11a. Since the driving status of the trailer 1b is not transmitted when the controller 16 determines that the vehicle goes straight, the electric power consumption of the trailer side communication device 11b is reduced. That is, the driving status of the trailer 1b is not transmitted when it is not necessary to transmit the driving status of the trailer 1b. Further, since the driving status of the trailer 1b is not transmitted when it is not necessary to transmit the driving status of the trailer 1b, the interference to other wireless communications around the vehicle such as the inter-vehicle communication is restricted.

On the other hand, when the controller 16 determines that the vehicle does not go straight, i.e., when the determination at step S2 is "NO," it goes to step S3. At step S3, the controller 16 executes the trailer driving status obtaining process. Then, it goes to step S4. In the trailer driving status obtaining process, the driving status of the trailer 1b such as the trailer position, the driving direction of the trailer 1b, the vehicle speed of the trailer 1b and the like is obtained. The trailer driving status obtaining process at step S3 corresponds to the first trailer driving status obtaining device and the second trailer driving status obtaining device.

The trailer position is detected by the position detector 5 arranged on the trailer 1b. The vehicle speed of the trailer 1b is detected by the wheel speed sensor 53 arranged on the trailer 1b.

The travelling direction of the trailer 1b is obtained by calculating based on the information from the geo magnetic sensor 51 and the gyro scope 52 arranged on the trailer 1b. The travelling direction is an orientation angle, which is defined by the north direction as a standard direction. The travelling direction of the trailer 1b is determined such that a straight line is defined by a least-square method with using coordinates of a few points of the latest trailer position recently detected by the position detector, and the direction of the straight line is defined as the travelling direction of the trailer 1b.

At step S4, the controller 16 executes the trailer driving status transmission process, and then, it goes to step S5. In the trailer driving status transmission process, the driving status of the trailer 1b obtained in the trailer driving status obtaining process is transmitted via the trailer side communication unit 15. Thus, the trailer side communication unit 15 corresponds to the trailer side transmission device.

When the driving status of the trailer 1b is transmitted, the driving status is transmitted together with a time stamp such as detected or obtained GPS time. Further, when the riving status of the trailer 1b is transmitted, the driving status is transmitted together with identification information such as a device ID of the trailer side communication device 11b, which specifies a transmission source.

In the trailer driving status transmission process, the driving status of the trailer 1b may be transmitted repeatedly at predetermined transmission intervals until the controller 16 determines in the go-straight determination process that the vehicle goes straight. Alternatively, it goes to step S5 after a predetermined time interval has elapsed since the driving status of the trailer 1b is transmitted, and then, it returns to step S4 again and the driving status of the trailer 1b may be transmitted again.

At step S5, when the ignition power source turns off, i.e., when the determination in step S5 is "YES," the trailer driving status transmission process in FIG. 4 is completed. When the ignition power source does not turn off, i.e., when the determination in step S5 is "NO," it returns to step S1.

Next, the towing vehicle side driving status transmission process executed by the towing vehicle side controller 14 in the towing vehicle side communication device 11a at the object vehicle B will be explained with reference to FIG. 5. The controller 14 starts to execute the flowchart in FIG. 5 when the ignition power source turns on.

At step S21, the controller 14 determines whether the vehicle starts to change in direction. For example, the controller 14 determines that the vehicle starts to change in direction when the steering wheel angle detected by the steering wheel angle sensor 3 exceeds the start determination threshold value. Here, the start determination threshold value is settable appropriately and an absolute value of the predetermined steering wheel angle, which defined that the vehicle goes straight.

When the controller 14 determines that the vehicle starts to change in direction, i.e., when the determination in step S21 is "YES," it goes to step S22. When the controller 14 determines that the vehicle does not start to change in direction, i.e., when the determination in step S21 is "NO," it goes to step S25.

At step S22, the controller 14 executes the driving status accumulation process, and then, it goes to step S23. In the driving status accumulation process, the driving status of the towing vehicle 1a such as the towing vehicle position, the travelling direction of the towing vehicle 1a, the vehicle speed of the towing vehicle 1a and the like is obtained. Then, the obtained driving status is stored in a writable memory such as a RAM in the towing vehicle side controller 14. When the driving status of the towing vehicle is accumulated in the memory, the driving status of the towing vehicle is accumulated together with a time stamp such as obtained or detected GPS time. The driving status accumulation process at step S22 corresponds to the second towing vehicle driving status obtaining device.

The towing vehicle position may be detected by the position detector 2 arranged on the towing vehicle 1a. The vehicle speed of the towing vehicle 1a may be detected by the wheel speed sensor 23 arranged on the towing vehicle 1a.

The travelling direction of the towing vehicle 1a may be obtained by calculating based on the information from the geo magnetic sensor 21 and the gyroscope 22, which are arranged on the towing vehicle 1a. The travelling direction is an orientation angle having the standard direction of the north. The travelling direction of the towing vehicle is determined such that a straight line is defined by a least-square method with using coordinates of a few points of the latest towing vehicle position recently detected by the position detector 2, and the direction of the straight line is defined as the travelling direction of the towing vehicle 1*a*.

In the driving status accumulation process, the driving status of the trailer 1*b* successively transmitted from the trailer side communication unit 15 in the trailer side communication device 11*b* is obtained via the towing vehicle side communication unit 13. Thus, the towing vehicle side communication unit 13 corresponds to the towing vehicle side receiver. Here, the determination whether the driving status is transmitted from the trailer side communication device 11*b* of the subject vehicle is performed by the identification information attached to the driving status.

In the driving status accumulation process, the driving status of the trailer 1*b* obtained from the trailer side communication device 11*b* is also accumulated in the memory, similar to the driving status of the towing vehicle 1*a*. When the driving status of the trailer 1*b* is accumulated in the memory, the driving status together with the time stamp is accumulated.

At step S23, the controller 14 determines whether the direction change of the subject vehicle is completed. Thus, steps S21 and S23 correspond to the direction change determination device. For example, the controller 14 determines that the direction change of the subject vehicle is completed when the vehicle travels for a predetermined distance after the steering wheel angle detected by the steering wheel angle sensor 3 falls below the completion determination threshold value. Here, the completion determination threshold value is an absolute value of the predetermined steering wheel angle, which defined that the vehicle goes straight. In view of the hysteresis, the completion determination threshold value is set to be smaller than the start determination threshold value. The predetermined distance is set to a distance, which is estimated that the vehicle runs until the direction change of the trailer 1*b* is completed after the direction change of the towing vehicle 1*a* is performed.

When the direction change of the subject vehicle is completed, i.e., when the determination in step S23 is "YES," it goes to step S24. When the direction change of the subject vehicle is not completed, i.e., when the determination in step S23 is "NO," it returns to step S22.

At step S24, the controller 14 executes the accumulated driving status transmission process. Then, it goes to step S25. In the accumulated driving status transmission process, the driving status of the towing vehicle 1*a* and the driving status of the trailer 1*b*, which are accumulated in the driving status accumulation process after the controller 14 determines that the vehicle starts to change in direction and before the controller 14 determines that the direction change is completed, are transmitted via the outside communication unit 12. Thus, the accumulated driving status transmission process at step S24 corresponds to the leading vehicle side transmission device.

When the driving status of the towing vehicle 1*a* and the driving status of the trailer 1*b* are transmitted, the driving status of the towing vehicle 1*a* and the driving status of the trailer 1*b* are transmitted together with the vehicle ID or the device ID of the towing vehicle side communication device 11*a*, which specifies the transmission source.

Figure 5:
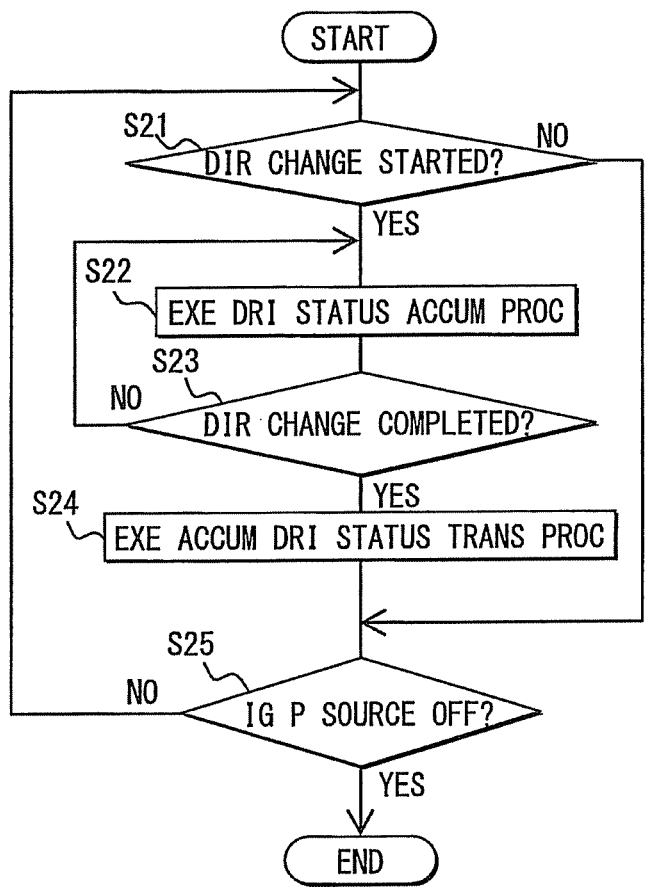
FIG. 5 is a flowchart showing a towing vehicle side driving status transmission process executed in a towing vehicle side controller.

At step S25, when the ignition power source turns off, i.e., when the determination at step S25 is "YES," the towing vehicle side driving status transmission process in FIG. 5 is completed. When the ignition power source does not turn off, i.e., when the determination at step S25 is "NO," it returns to step S21.

Figure 6:
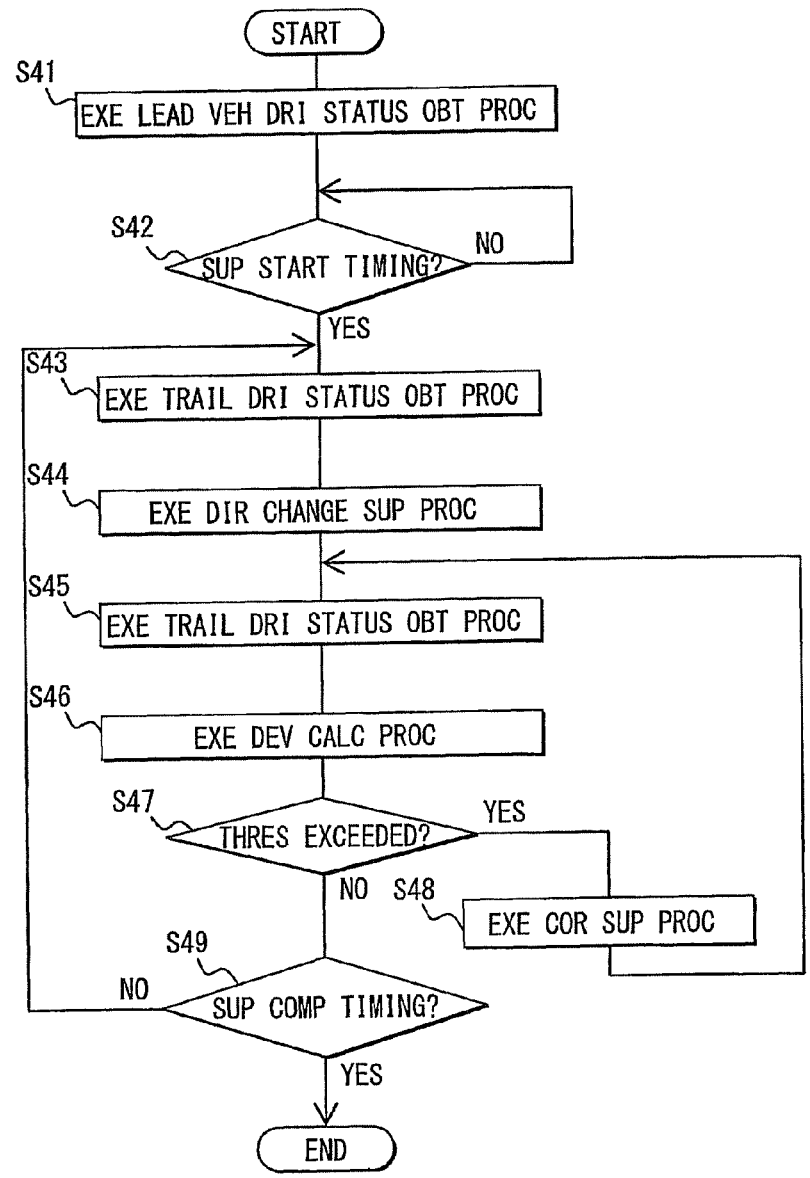
FIG. 6 is a flowchart showing a direction change support process executed in a towing vehicle side controller according to a first embodiment.

Next, the direction change support process executed by the towing vehicle side controller 14 in the towing vehicle side communication device 11*a* at the vehicle A will be explained with reference to FIG. 6. The controller 14 starts to execute the direction change support process when the outside communication unit 12 of the towing vehicle side communication device 11*a* in the vehicle A receives the driving status of the towing vehicle 1*a* and the driving status of the trailer 1*b* in the vehicle B after the vehicle B starts to change in direction and before the vehicle B ends the direction change, which are transmitted from the towing vehicle side communication device 11*a* of the vehicle B as a leading vehicle of the vehicle A on the ahead road.

The identification of the driving status of the towing vehicle 1*a* and the driving status of the trailer 1*b* in the vehicle B, which travels ahead of the vehicle A on the road, is performed by the determination based on the identification information of the vehicle B set as a leading vehicle of the vehicle A when the vehicle A is controlled by a conventional vehicle following control method such that an inter-vehicle distance between the vehicles A and B is kept to be a target inter-vehicle distance. When the vehicle A is not controlled by the vehicle following control method, the identification of the driving status of the towing vehicle 1*a* and the driving status of the trailer 1*b* in the vehicle B is performed by the determination based on the towing vehicle position and the trailer position in the driving status of the vehicle B, the towing vehicle position and the trailer position in the driving status of the vehicle A and conventional map data.

At step S41, the controller 14 executes the leading vehicle driving status obtaining process. Then, it goes to step S42. In the leading vehicle driving status obtaining process, the driving status of the towing vehicle 1*a* and the trailer 1*b* in the vehicle B, which is received by the outside communication unit 12 of the vehicle A, is obtained. Thus, the leading vehicle driving status obtaining process at step S41 corresponds to the leading vehicle driving status obtaining device.

At step S42, the controller 14 determines whether a start timing for supporting the direction change has come. The start time is defined as a support start timing. When the controller 14 determines that the support start timing has come, i.e., when the determination in step S42 is "YES," it goes to step S43. When the controller 14 determines that the support start timing does not have come, i.e., when the determination in step S42 is "NO," it returns to step S42 so as to repeat step S42. Here, in an object time period, in which the direction change support is performed according to the driving status of the vehicle B, when the vehicle A changes in direction different from the vehicle B, or the vehicle A goes straight, the controller 14 may end the direction change support process.

In a case where the vehicle A is controlled by the vehicle following control method, the support start timing may be, for example, just after the leading vehicle driving status obtaining process is completed or after a predetermined time interval has elapsed after the leading vehicle driving status obtaining process. When the vehicle A is not controller by the vehicle following control method, the support start timing may be, for example, a timing when the controller 14 confirms that the vehicle A changes in direction, which is the same as the vehicle B, or a timing after a predetermined time interval has elapsed after the controller 14 confirms that the vehicle A changes in the same direction as the vehicle B.

In a case where the information about the route guidance in the navigation device is obtained by the controller 14 in the vehicle A, an estimation for estimating the changing direction of the vehicle A, which is the same as to vehicle B, is performed according to the route guidance. Alternatively, the estimation may be performed according to a change direction of the steering wheel angle of the vehicle A or a signal of a blinker (a direction indicator). Alternatively, the estimation may be performed according to information when the information defining that a driving traffic lane of the vehicle A corresponds to a left-turn-only lane or a right-turn-only lane is obtained from a conventional map data or driving traffic lane information that is obtained by a beacon arranged on an approach lane of the intersection in a case where the vehicle turns right or left at the intersection.

At step S43, the controller 14 executes the towing vehicle driving status obtaining process, and then, it goes to step S44. In the towing vehicle driving status obtaining process, the driving status of the towing vehicle 1a is obtained. The towing vehicle driving status obtaining process at step S43 corresponds to the first towing vehicle status obtaining device. The towing vehicle driving status obtaining process for obtaining the driving status of the towing vehicle 1a is performed similar to the driving status accumulation process at step S22.

At step S44, the controller 14 executes the direction change support process, and then, it goes to step S45. In the direction change support process, the controller 14 supports the driver to change in direction of the vehicle A in such a manner that the driving status of the towing vehicle 1a of the vehicle A successively obtained in the towing vehicle driving status obtaining process approaches the driving status of the towing vehicle 1a of the vehicle B obtained from the direction change start time to the direction change complete time in the leading vehicle driving status obtaining process. Thus, the direction change support process at step S44 corresponds to the support device.

For example, the controller 14 supports the driver to drive the towing vehicle 1a of the vehicle A so as to follow the driving status of the towing vehicle 1a of the vehicle B from the direction change start time to the direction change complete time. Specifically, the controller 14 supports the driver to change in direction of the vehicle A so as to coincide the towing vehicle position, the travelling direction and the vehicle speed of the towing vehicle 1a of the vehicle A with the towing vehicle position, the travelling direction and the vehicle speed of the towing vehicle 1a of the vehicle B from the direction change start time to the direction change complete time.

Here, the controller 14 may support the direction change for the driver so as to change only the towing vehicle position of the vehicle A similar to the vehicle B. In this case, a trajectory of the towing vehicle position of the vehicle B from the direction change start time to the direction change complete time is referred as a recommended trajectory (i.e., a recommended towing vehicle trajectory). A perpendicular line drawn from the towing vehicle position of the vehicle A to the recommended towing vehicle trajectory intersects the recommended towing vehicle trajectory at an intersection point. The controller 14 supports the driver so as to reduce a distance between the intersection point and the towing vehicle position of the vehicle A. Alternatively, the controller 14 may support the direction change for the driver so as to change only the travelling direction of the towing vehicle is of the vehicle A similar to the vehicle B.

The support for changing in direction may be performed by automatically operating the steering wheel according to an instruction of EPS-ECU (electric power steering-electric control unit), which is not shown in the drawings. Alternatively, the support for changing in direction may be performed by automatically accelerating and decelerating according to an instruction from an engine ECU or a brake ECU, which is not shown in the drawings. Alternatively, the support for changing in direction may be performed by guiding and showing an operation amount and/or an operation timing of the steering wheel, the acceleration pedal and the brake pedal on a display device, which is not shown in the drawings. Alternatively, the support for changing in direction may be performed by outputting a sound guidance for showing an operation amount and/or an operation timing of the steering wheel, the acceleration pedal and the brake pedal on a sound output device, which is not shown in the drawings.

When the support for changing in direction is performed by automatically operating the steering wheel and/or automatically accelerating and decelerating, the operation amount and/or the operation timing of the steering wheel, the acceleration pedal and the brake pedal as the driving status are utilized so that the support for changing in direction is performed to coincide the driving operation of the vehicle A with the vehicle B.

Figure 7:
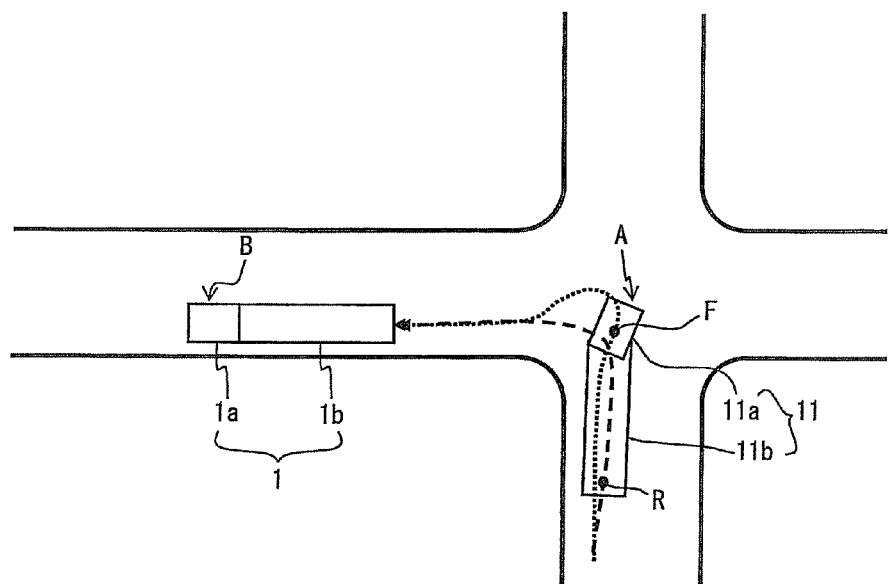
FIG. 7 is a diagram showing a driving support feature when the vehicle changes in direction.

When the vehicle type of the vehicle A is the same as the vehicle B, and the carrying load of the vehicle A is nearly equal to the vehicle B, or when the total length of the vehicle A is nearly equal to the vehicle B, and the carrying load of the vehicle A is nearly equal to the vehicle B, not only the behavior of the towing vehicle 1a of the vehicle A but also the behavior of the trailer 1b of the vehicle A coincide with the vehicle B. Accordingly, when the trajectory of the towing vehicle 1a of the vehicle A coincides with the trajectory of the towing vehicle 1a of the vehicle B, the trajectory of the trailer 1b of the vehicle A coincides with the trajectory of the trailer 1b of the vehicle B, as shown in FIG. 7. In FIG. 7, a reference "F" represents the towing vehicle position of the vehicle A. A reference "R" represents the trailer position of the vehicle A. Further, a broken arrow line in FIG. 7 represents the trajectory of the towing vehicle position of the vehicle B, and the dotted arrow line in FIG. 7 represents the trajectory of the trailer position of the vehicle B.

At step S45, the controller 14 executes the trailer driving status obtaining process, and then, it goes to step S46. In the trailer driving status obtaining process, the driving status of the trailer 1b of the vehicle A transmitted from the trailer side communication unit 15 in the trailer side communication device 11b of the vehicle A is obtained via the towing vehicle side communication unit 13. The obtaining process of the driving status of the trailer 1b of the vehicle A is performed similar to the process in step S22.

At step S46, the controller 14 executes the deviation calculation process, and then, it goes to step S47. In the deviation calculation process, the controller 14 calculates a deviation of the driving status of the trailer 1b of the vehicle A obtained in the trailer driving status obtaining process from the driving status of the trailer 1b of the vehicle B obtained in the leading vehicle driving status obtaining process. Thus, the deviation calculation process at step S46 corresponds to the trailer deviation calculation device.

For example, a trajectory of the trailer position of the vehicle B from the direction change start time to the direction change complete time is referred as a recommended trajectory (i.e., a recommended trailer trajectory). A perpendicular line drawn from the trailer position of the vehicle A to the recommended trailer trajectory intersects the recommended trailer trajectory at an intersection point. The controller 14 calculates a distance between the intersection point and the trailer position of the vehicle A as the deviation.

At step S47, when the deviation obtained in the deviation calculation process exceeds a threshold deviation, i.e., when the determination at step S47 is "YES," it goes to step S48. When the deviation obtained in the deviation calculation process does not exceed a threshold deviation, i.e., when the determination at step S47 is "NO," it goes to step S49. Here, the threshold deviation is appropriately determined such that it is estimated that the vehicle A may run over the driving allowance region when the controller 14 continues to execute the direction change support process at step S44 with the threshold deviation. Here, a deviation threshold may be set with respect to a deviation along a changing direction of the vehicle A, and another deviation threshold may be set with respect to a deviation along a direction opposite to the changing direction of the vehicle A. Alternatively, the deviation threshold along the changing direction may be equal to the other deviation threshold along the direction opposite to the changing direction.

At step S48, the controller 14 executes the correction support process, and then, it goes to step S45. Thus, steps S45 to S47 are repeated. In the correction support process, the controller 14 supports the driver to drive the towing vehicle is of the vehicle A so as to reduce the deviation calculated in the deviation calculation process so that the controller 14 executes the direction change support. Thus, the correction support process at step S48 corresponds to a support device.

In the correction support process, a procedure of the direction change in a case where the vehicle A turns right or left at the intersection may be different from a procedure of the direction change in a case where the vehicle A changes a traffic lane. The towing vehicle side controller 14 determines according to the following method whether the vehicle A turns right or left at the intersection, or the vehicle A changes the traffic lane.

For example, the controller 14 determines based on the towing vehicle position of the vehicle A and the map data whether the vehicle A is disposed at the intersection. When the vehicle A is disposed at the intersection, the controller 14 determines that the vehicle A turns right or left. When the vehicle A is not disposed at the intersection, the controller 14 determines that the vehicle changes the traffic lane. Alternatively, the controller 14 may determine that the vehicle A turns right or left at the intersection when a curvature radius R of the recommended towing vehicle trajectory and/or the recommended trailer trajectory is equal to or larger than a threshold radius. The controller 14 may determine that the vehicle A changes the traffic lane when the curvature radius R of the recommended towing vehicle trajectory and/or the recommended trailer trajectory is smaller than a threshold radius.

When the vehicle A changes in direction at a curve, the correction support process may be executed by the controller 14, similar to a case where the vehicle A changes the traffic lane. When the curvature radius R of the recommended towing vehicle trajectory and/or the recommended trailer trajectory is equal to or larger than the threshold radius, the correction support process may be executed by the controller 14, similar to a case where the vehicle A turns right or left at the intersection.

With reference to FIGS. 8A to 10, the correction support process will be explained as follows. The reference "F" in FIGS. 8A to 10 represents the towing vehicle position of the vehicle A, and the reference "R" represents the trailer position of the vehicle A. Further, a broken arrow line in FIGS. 8A to 10 represents the trajectory of the towing vehicle position of the vehicle B, and the dotted arrow line in FIGS. 8A to 10 represents the trajectory of the trailer position of the vehicle B, and a solid arrow line in FIGS. 8A to 10 represents a trajectory of the towing vehicle position of the vehicle A, which is corrected in the correction support process.

Figure 8A:
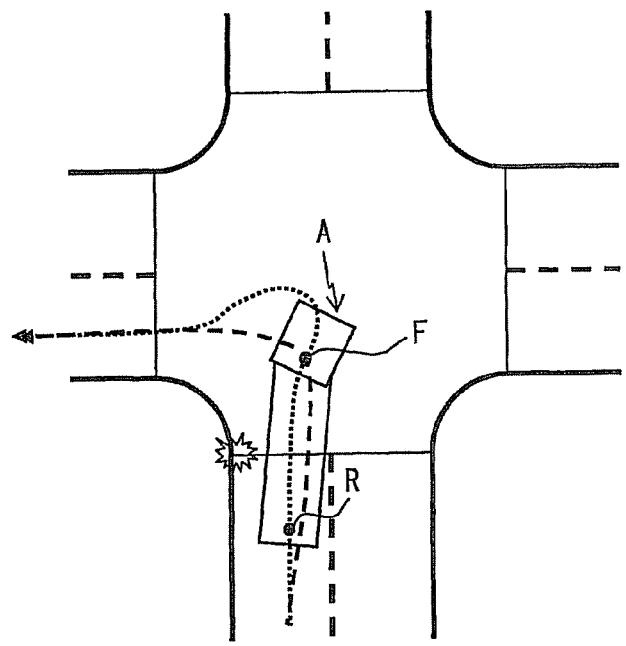
FIGS. 8A and 8B are diagrams showing a correction support process in a case where a deviation of a direction, to which the vehicle changes in direction, exceeds a threshold when the vehicle turns left at an intersection.
Figure 8B:
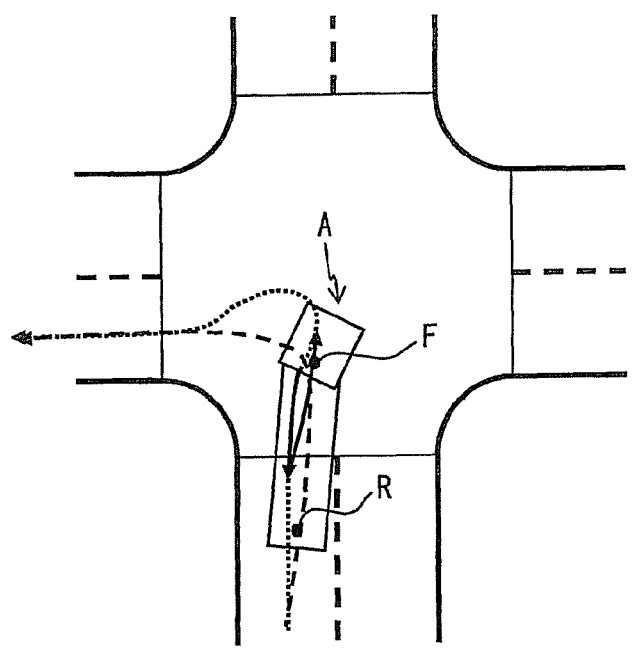

With reference to FIG. 8A to 8B, the correction support process will be explained when the deviation along the changing direction of the vehicle A exceeds the threshold in a case where the vehicle A turns left at the intersection.

When the controller 14 continues to execute the direction change support process under a condition that the deviation of the vehicle A along the changing direction exceeds the threshold in a case where the vehicle A turns left at the intersection, a possibility that the trailer 1b of the vehicle A may run over the road boundary disposed on an inner side of the corner is high, as shown in FIG. 8A.

Thus, in the correction support process, as shown the solid arrow line in FIG. 8B, the towing vehicle 1a of the vehicle A backs up temporally, and the controller 14 supports the direction change such that the vehicle A turns at the intersection so as to make an expansion of the trajectory of the towing vehicle position to the direction opposite to the changing direction to be larger than the recommended towing vehicle trajectory. Thus, the controller 14 supports the driver not to run over the driving allowance region. Similarly, the controller 14 supports the driver to change in direction when the vehicle A turns right at the intersection.

Next, the correction support process will be explained with reference to FIGS. 9A to 9C when the deviation of the vehicle A along the direction opposite to the changing direction exceeds the threshold value in a case where the vehicle turns left at the intersection.

Figure 9A:
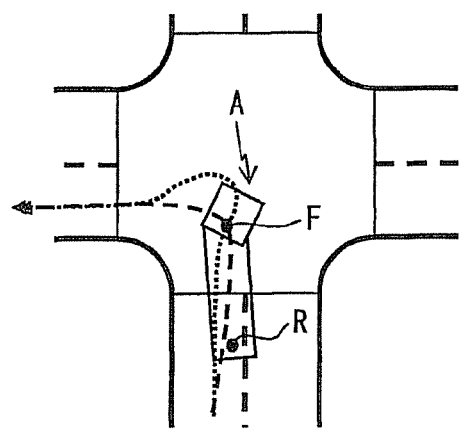
FIGS. 9A to 9C are diagrams showing the correction support process in a case where a deviation of a direction, to which the vehicle changes in direction, exceeds the threshold when the vehicle turns left at the intersection.
Figure 9B:
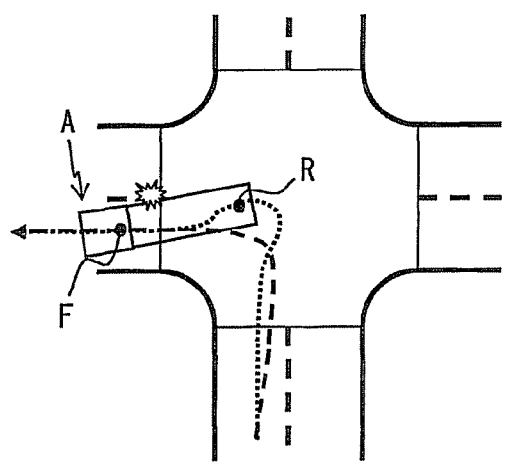

When the controller 14 continues to execute the direction change support process under a condition that the deviation of the vehicle A along the direction opposite to the changing direction of the vehicle A exceeds the threshold in a case where the vehicle A turns left at the intersection, a possibility that the trailer 1b of the vehicle A may run over an opposite traffic lane disposed on an exit side road from the intersection is high, as shown in FIG. 9A.

Figure 9C:
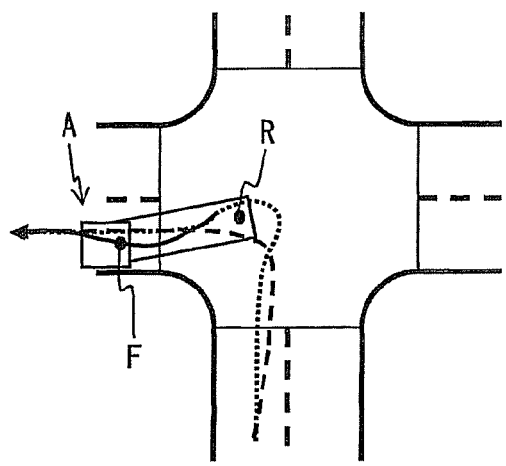

Thus, in the correction support process, as shown the solid arrow line in FIG. 9C, the controller 14 supports the direction change such that the trajectory of the towing vehicle position of the vehicle A expands to the direction (i.e., a road side direction) opposite to the changing direction after the vehicle A turns at the intersection. Thus, the controller 14 supports the driver not to run over the driving allowance region. Similarly, the controller 14 supports the driver to change in direction when the vehicle A turns right at the intersection.

Figure 10:
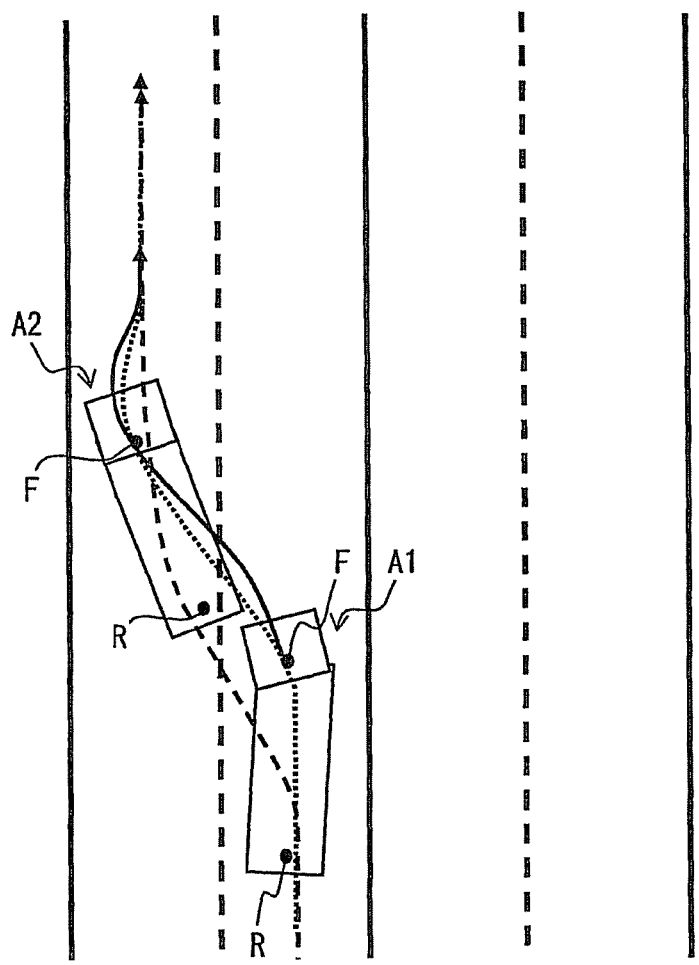
FIG. 10 is a diagram showing a correction support process in a case where a deviation exceeds the threshold when the vehicle changes a traffic lane.

Next, the correction support process will be explained with reference to FIG. 10 when the deviation of the vehicle A exceeds the threshold in a case where the vehicle changes the traffic lane. When the vehicle changes the traffic lane, and the deviation of the vehicle A along the changing direction of the vehicle A exceeds the threshold, as shown an arrow A1 in FIG. 10, the controller 14 executes the direction change support along with the solid arrow line in FIG. 10 so as to coincide the towing vehicle position of the vehicle A with the recommended towing vehicle trajectory. On the other hand, when the vehicle changes the traffic lane, and the deviation of the vehicle A along the direction opposite to the changing direction of the vehicle A exceeds the threshold, as shown an arrow A2 in FIG. 10, the controller 14 executes the direction change support along with the solid arrow line in FIG. 10 so as to coincide the towing vehicle position of the vehicle A with the recommended towing vehicle trajectory. Thus, the controller 14 supports the driver not to run over the driving allowance region.

At step S49, the controller 14 determines whether the support completion timing for the direction change has come. When the controller 14 determines that the support completion timing for the direction change has come, i.e., when the determination in step S49 is "YES," the direction change support process in FIG. 6 is completed. When the controller 14 determines that the support completion timing for the direction change does not have come, i.e., when the determination in step S49 is "NO," it returns to step S43. Then, steps S43 to S49 are repeated.

For example, the controller 14 determines that the support completion timing has come when the towing vehicle position and the trailer position of the vehicle A reach the towing vehicle position and the trailer position of the vehicle B, which are recorded finally in the time order in the driving status of the vehicle B obtained in the leading vehicle driving status obtaining process. Alternatively, the support completion timing may have come when the controller 14 determines based on the steering wheel angle detected by the steering wheel angle sensor 3 that a predetermined time interval has elapsed or the vehicle A travels for a predetermined distance under a condition that the vehicle A goes straight.

In view of the first embodiment, even if the carrying load of the vehicle A is different from the vehicle B that goes ahead of the vehicle A, the vehicle A can change in direction by following the trajectory of the vehicle B, which changes in direction without running over the driving allowance region. Thus, when the controller 14 supports the driver to change in direction of the vehicle A including the towing vehicle 1a together with the trailer 1b, the controller 14 supports the driver of the trailer coupling vehicle 1 not to run over the driving allowance region.

In the present embodiment, the driving status includes information about the vehicle position such as the towing vehicle position and the trailer position, the travelling direction and the vehicle speed. The driving status may include other information as long as the driving status includes information about the behavior and the vehicle position of the trailer coupling vehicle 1.

When the vehicle changes in direction, a drive supporting method for supporting the driver of the vehicle A so as to fit the driving status of the towing vehicle 1a and the trailer 1b in the vehicle A to the driving status of the towing vehicle 1a and the trailer 1b in the vehicle B may be a method other than the method according to the first embodiment.

In the first embodiment, the driving status of the vehicle B from the direction change start time to the direction change complete time is transmitted from the towing vehicle side communication device 11a of the vehicle B at one time. Alternatively, the towing vehicle side communication device 11a of the vehicle B may successively transmit the driving status of the trailer 1b obtained in the trailer driving status obtaining process and the driving status of the towing vehicle 1a obtained in the driving status accumulation process via the outside communication unit 12 according to a modification of the first embodiment.

In the modification of the first embodiment, the towing vehicle side communication device 11a starts to store the driving status of the vehicle B obtained from the towing vehicle side communication device 11a of the vehicle B in the memory when the controller 14 determines based on the towing vehicle position of the vehicle A and the map data that the vehicle A approaches the intersection.

In the first embodiment, the towing vehicle side communication device 11a of the vehicle A obtains the driving status of the vehicle B via the inter-vehicle communication. Alternatively, when the driving support system 100 supports the driver to turn left at the intersection, a road side device arranged at the intersection may obtain the driving status of the vehicle B via the road-to-vehicle communication, and the road side device may transmit the driving status of the vehicle B to the vehicle A via the road-to-vehicle communication so that the towing vehicle side communication device 11a of the vehicle A obtains the driving status of the vehicle B, according to a second modification of the first embodiment. In this case, the outside communication unit 12 of the towing vehicle side communication device 11a is capable of communicating with the road side device.

According to the second modification of the first embodiment, even if the vehicle A can not communicate with the vehicle B because the vehicle B is not disposed in a communication range of the inter-vehicle communication or an obstacle exists between the vehicles A and B, the driving support system 100 can support the vehicle A with using the driving status of the vehicle B when the vehicle A turns right or left at the intersection.

(Second Embodiment)

In the first embodiment, the driving support device 11 of the vehicle A receives the driving status of the towing vehicle 1a and the trailer 1b of the vehicle B from the driving support device 11 of the vehicle B, and the driving support device 11 of the vehicle A supports the driver to change in direction by following the trajectory of the vehicle B. In the second embodiment, the driving support device 11 of the vehicle A receives a recommended ideal trajectory of the towing vehicle and the trailer of the trailer coupling vehicle from the road side device 9, and the driving support device 11 of the vehicle A supports the driver to change in direction by following the recommended ideal trajectory.

Figure 11:
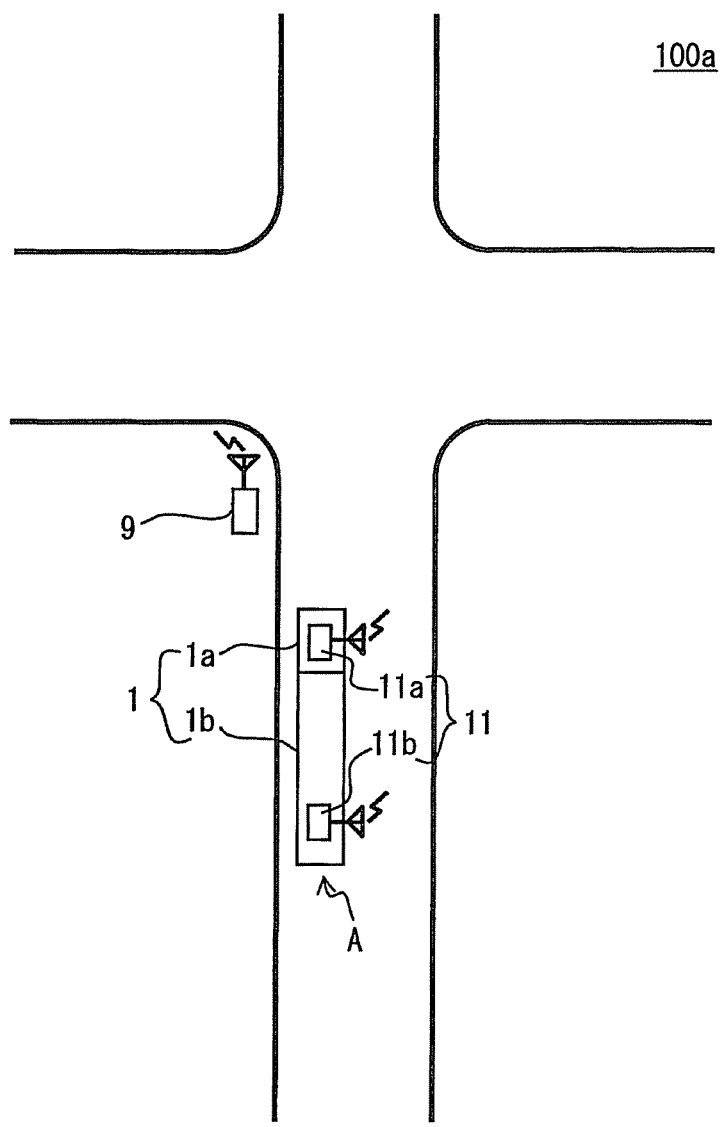
FIG. 11 is a diagram showing a driving support system according to a second embodiment.

As shown in FIG. 11, the driving support system 100a includes the driving support device 11 mounted on the trailer coupling vehicle 1 as the vehicle A and the road side device 9.

In the driving support device 11 according to the second embodiment, the outside communication unit 12 of the towing vehicle side communication device 11a is capable of communicating with the road side device 9. Further, a part of the direction change support process executed by the towing vehicle side controller 14 in the towing vehicle side communication device 11a is different from the first embodiment. Other functions of the driving support device 11 according to the second embodiment are similar to the first embodiment.

The road side device 9 is arranged at the intersection. The road side device 9 includes a memory (not shown), which stores the recommended ideal trajectory of the towing vehicle position and the trailer position of the trailer coupling vehicle. The recommended ideal trajectory provides the information for turning right or left at the intersection without running over the driving allowance region when the ideal trailer coupling vehicle turns right or left from an entering side road of the intersection. The road side device 9 reads out the recommended ideal trajectory from the memory, and then, the device 9 transmits the recommended ideal trajectory at predetermined transmission intervals via the conventional road-to-vehicle communication.

The recommended ideal trajectory of the ideal trailer coupling vehicle may be prepared by an actual trajectory of a certain trailer coupling vehicle in a case where a skillful driver actually drives the certain trailer coupling vehicle with a certain carrying load and turns right or left at the intersection, and the actual trajectory is preliminarily stored in the memory as the recommended ideal trajectory. Alternatively, the recommended ideal trajectory may be prepared by a calculated trajectory via a simulation method, and the calculated trajectory is preliminarily stored in the memory as the recommended ideal trajectory.

The road side device 9 may include an optical beacon that limits a communication range to a specific traffic lane so that the road side device 9 transmits only the recommended ideal trajectory to a vehicle, which enters into the intersection from the specific traffic lane. For example, when the specific traffic lane is a right turn lane or a right turn or through lane, the device 9 transmits only the recommended ideal trajectory for turning right. In this case, the road side device 9 may be arranged at each entering side road of the intersection.

Alternatively, the road side device 9 transmits the recommended ideal trajectory for all of trajectory patterns with regard to each entering side road of the intersection. In this case, the towing vehicle side controller 14 of the towing vehicle side communication device 11a determines from which entering side road the vehicle A enters into the intersection, and the controller 14 selects one of the trajectory patterns of the recommended ideal trajectory according to a determination result of the entering side road. In this case, only one road side device 9 may be arranged at the intersection, and the communication range of the road-to-vehicle communication covers a periphery of the intersection.

Figure 12:
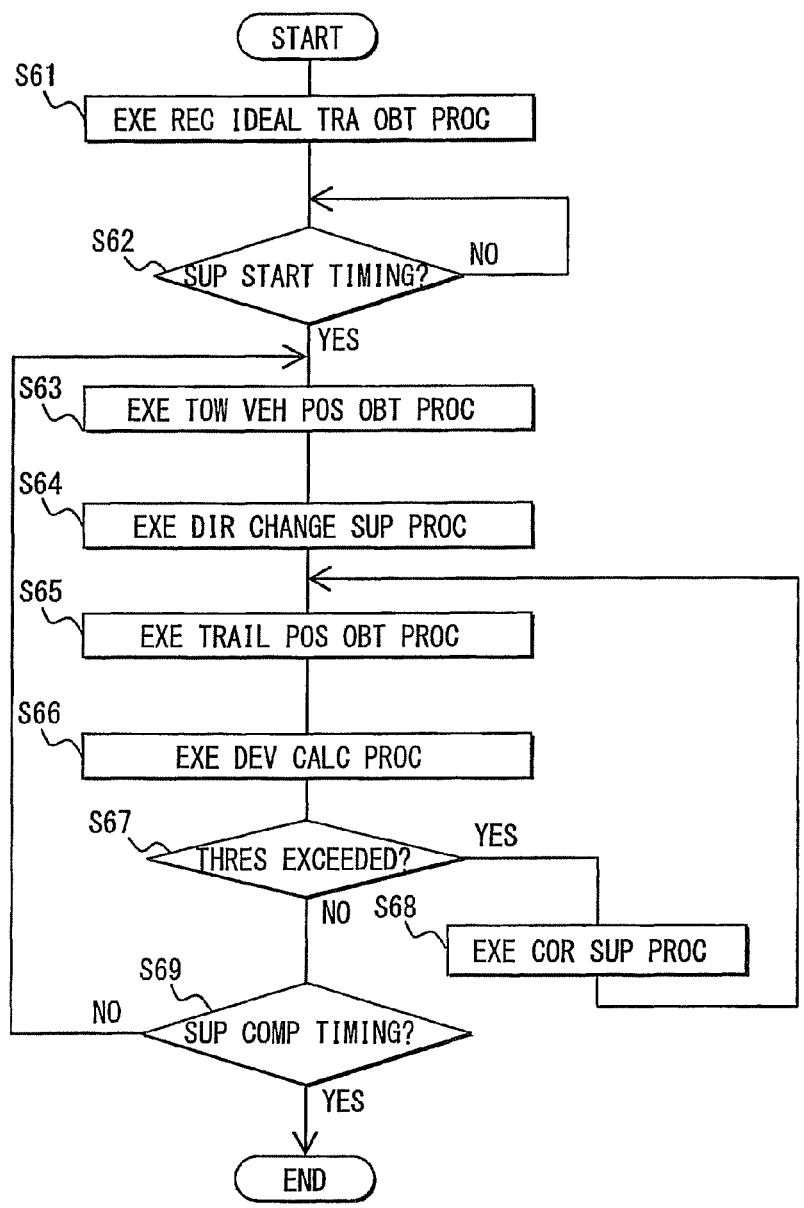
FIG. 12 is a flowchart showing a direction change support process executed in a towing vehicle side controller according to the second embodiment.

Here, with reference to FIG. 12, the direction change support process executed by the towing vehicle side controller 14 in the towing vehicle side communication device 11a according to the second embodiment will be explained. The controller 14 starts to execute a flowchart in FIG. 12 when the outside communication unit 12 of the towing vehicle side communication device 11a of the vehicle A receives the recommended ideal trajectory from the road side device 9.

At step S61, the controller 14 executes the recommended ideal trajectory obtaining process, and then, it goes to step S62. In the recommended ideal trajectory obtaining process, the controller 14 obtains the recommended ideal trajectory received by the outside communication unit 12 of the vehicle A. Thus, the recommended ideal trajectory obtaining process at step S61 corresponds to the recommended ideal trajectory obtaining device.

At step S62, the controller 14 determines whether the support start timing for starting the direction change support has come. When the controller 14 determines that the support start timing has come, i.e., when the determination in step S65 is "YES," it goes to step S63. When the controller 14 determines that the support start timing does not have come, i.e., when the determination in step S65 is "NO," it goes to step S62 to repeat step S62. Here, when the vehicle A goes straight through an object intersection, the controller 14 completes the direction change support process.

The support start timing may be, for example, a timing when the controller 14 estimates that the vehicle A changes in direction at the object intersection, or a timing after a predetermined time interval has elapsed after the controller 14 estimates that the vehicle A changes in direction at the object intersection. The estimation that the vehicle A changes in direction at the object intersection is performed by the route guidance when the information about the route guidance is obtained from the navigation device of the vehicle A. Alternatively, the estimation may be performed according to a change direction of the steering wheel angle of the vehicle A or a signal of a blinker (a direction indicator). Alternatively, the estimation may be performed according to information that the controller 14 confirms that the driving traffic lane of the vehicle A is a turn right lane or a turn left lane.

At step S63, the controller 14 executes the towing vehicle position obtaining process, and then, it goes to step S64. In the towing vehicle position obtaining process, the controller 14 obtains the towing vehicle position of the vehicle A. The towing vehicle position obtaining process at step S63 corresponds to the towing vehicle position obtaining device. The obtaining method of the towing vehicle position of the vehicle A is performed, similar to the process at step S22.

At step S64, the controller 14 executes the direction change support process, and then, it goes to step S65. In the direction change support process, the controller 14 supports the driver to change in direction of the towing vehicle 1a of the vehicle A so as to bring the towing vehicle position of the vehicle A, which is obtained in the towing vehicle position obtaining process, closer to the recommended ideal towing vehicle trajectory of the recommended ideal trajectory obtained in the recommended ideal trajectory obtaining process. Thus, the direction change support process at step S64 corresponds to the support device.

For example, a perpendicular line drawn from the towing vehicle position of the vehicle A to the recommended ideal towing vehicle trajectory intersects the recommended ideal towing vehicle trajectory at an intersection point. The controller 14 supports the driver so as to reduce a distance between the intersection point and the towing vehicle position of the vehicle A. The direction change support is performed similar to the process at step S44.

At step S65, the controller 14 executes the trailer position obtaining process, and then, it goes to step S66. In the trailer position obtaining process, the controller 14 obtains the trailer position transmitted from the trailer side communication unit 15 of the trailer side communication device 11b of the vehicle A via the towing side communication unit 13. The obtaining method of the trailer position of the vehicle A is performed similar to the process at step S22. The trailer side controller 16 corresponds to the trailer position obtaining device.

At step S66, the controller 14 executes the deviation calculation process, and then, it goes to step S67. In the deviation calculation process, the controller 14 calculates a deviation of the trailer position of the vehicle A obtained in the trailer position obtaining process from the recommended ideal trailer trajectory of the recommended ideal trajectory obtained in the recommended ideal trajectory obtaining process. For example, a perpendicular line drawn from the trailer position of the vehicle A to the recommended ideal trailer trajectory intersects the recommended ideal trailer trajectory at an intersection point. The controller 14 calculates a distance between the intersection point and the trailer position of the vehicle A as the deviation.

At step S67, when the deviation obtained in the deviation calculation process exceeds a threshold deviation, i.e., when the determination at step S67 is "YES," it goes to step S68. When the deviation obtained in the deviation calculation process does not exceed a threshold deviation, i.e., when the determination at step S67 is "NO," it goes to step S69.

At step S68, the controller 14 executes the correction support process, and then, it goes to step S65. Thus, steps S65 to S67 are repeated. The correction support process at step S68 corresponds to a support device. In the correction support process, the controller 14 supports the driver to drive the vehicle A so as to reduce the deviation calculated in the deviation calculation process so that the controller 14 executes the direction change support when the vehicle A turns right or left at the intersection.

At step S69, the controller 14 determines whether the support completion timing has come. When the controller 14 determines that the support completion timing for the direction change has come, i.e., when the determination in step S69 is "YES," the direction change support process in FIG. 12 is completed. When the controller 14 determines that the support completion timing for the direction change does not have come, i.e., when the determination in step S69 is "NO," it returns to step S63. Then, steps S63 to S69 are repeated.

For example, the controller 14 determines that the support completion timing has come when the towing vehicle position and the trailer position of the vehicle A reach the towing vehicle position and the trailer position of the recommended ideal trajectory, which are recorded finally in the time order in the recommended ideal trajectory obtained in the recommended ideal trajectory obtaining process. Alternatively, the controller 14 determines that the support completion timing may have come when the controller 14 determines based on the steering wheel angle detected by the steering wheel angle sensor 3 that a predetermined time interval has elapsed or the vehicle A travels for a predetermined distance under a condition that the vehicle A goes straight.

In the second embodiment, the controller 14 supports the driver to change in direction of the towing vehicle is of the vehicle A so as to bring the trajectory of the towing vehicle position and the trailer position of the vehicle A closer to the recommended ideal towing vehicle trajectory and the recommended ideal trailer trajectory of the ideal trailer coupling vehicle so that the vehicle A turns right or left at the intersection without running over the driving allowance region. Thus, the vehicle A can turn right or left at the intersection without running over the driving allowance region. Accordingly, when the system 100 supports the driver to change in direction of the trailer coupling vehicle, the trailer coupling vehicle does not run over the driving allowance region while the trailer coupling vehicle is changing in direction.

Here, a constitution of the first embodiment and a constitution of the second embodiment may be combined. For example, when the system 100 can obtain the driving status of the vehicle B, which goes ahead of the vehicle A, the controller 14 supports the driver to change in direction according to the constitution of the first embodiment. On the other hand, when the system 100 can not obtain the driving status of the vehicle B, but the system can obtain the recommended ideal trajectory from the road side device 9, the controller 14 supports the driver to change in direction according to the constitution of the second embodiment.

In a case where the receiver of the satellite positioning system is provided by the position detector 2, 5, and the controller 14 determines that the vehicle A goes straight, if the horizontal deviation of the coordinates between the towing vehicle position and the trailer position of the vehicle A is equal to or larger than a predetermined threshold value, the controller 14 may stop executing the direction change support since the controller 14 estimates that the receiving state of the satellite electric wave is not good. In this case, the controller 14 provides a display and/or a voice message indicating that "since the receiving state of the satellite electric wave is not good, the system does not execute the driving support." Here, the horizontal deviation of the coordinates between the towing vehicle position and the trailer position of the vehicle A represents the deviation of the coordinates along a right-left direction of the vehicle A.

Alternatively, the controller 14 may receive the information about a total length of the vehicle B in addition to the driving status of the vehicle B, which is a leading vehicle of the vehicle A. Alternatively, the controller 14 may receive the information about a total length of the ideal trailer coupling vehicle in addition to the recommended ideal trajectory from the road side device 9. In these cases, when a difference between the total length of the vehicle B or the ideal trailer coupling vehicle received by the towing vehicle side communication device 11a of the vehicle A and the total length of the vehicle A is equal to or larger than a predetermined length, the controller 14 may not execute the direction change support. In this case, controller 14 provides a display and/or a voice message indicating that the system does not execute the driving support. Here, the total length of the vehicle A is a length from a top end of the towing vehicle 1a to a rear end of the trailer 1b in the trailer coupling vehicle.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A driving support system for a first trailer-vehicle and a second trailer-vehicle, wherein the first trailer-vehicle includes a first vehicle and a first trailer that is coupled to and towed by the first vehicle, and the second trailer-vehicle includes a second vehicle and a second trailer coupled to and towed by the second vehicle, the driving system comprising:
   a leading vehicle driving status obtaining device configured to obtain a driving status of the second trailer-vehicle via wireless communication, wherein the second trailer-vehicle is a leading vehicle of the first trailer-vehicle, the driving status of the second trailer-vehicle indicates at least one of a behavior and a travelling point of each of the second vehicle and the second trailer as the second trailer-vehicle changes direction along a road ahead of the first trailer-vehicle;
   a first towing vehicle driving status obtaining device configured to successively obtain a driving status of the first vehicle;
   a first trailer driving status obtaining device configured to successively obtain a driving status of the first trailer;
   a support device configured to support a driver of the first trailer-vehicle to drive the first vehicle so as to bring the driving status of the first vehicle and the driving status of the first trailer closer to the driving status of the second vehicle and the driving status of the second trailer, respectively, when the first trailer-vehicle changes direction; and
   a second vehicle side communication device arranged at the second trailer-vehicle, wherein the second vehicle side communication device includes:
      a second towing vehicle driving status obtaining device configured to successively obtain a driving status of the second vehicle;
      a second trailer driving status obtaining device configured to successively obtain a driving status of the second trailer; and
      a second vehicle side transmission device,
   wherein the second trailer-vehicle has changed direction on the road ahead of the first trailer-vehicle,
   wherein the driving status of the second vehicle includes at least one of the behavior and the travelling point of the second vehicle while the second vehicle changes direction, and
   wherein the second vehicle side transmission device transmits the driving status of the second vehicle and the driving status of the second trailer via the wireless communication.

2. The driving support system according to claim 1, further comprising:
   a trailer deviation calculation device configured to calculate a trailer deviation of the driving status of the first trailer from the driving status of the second trailer, wherein the support device supports the driver of the first trailer-vehicle so as to bring the driving status of the first vehicle closer to the driving status of the second vehicle and so as to reduce the trailer deviation when the trailer deviation is equal to or larger than a predetermined trailer deviation.

3. The driving support system according to claim 1, further comprising:
- a trailer side transmission device configured to transmit the driving status of the first trailer via the wireless communication; and
- a towing vehicle side receiving device configured to receive the driving status of the first trailer that is transmitted by the trailer side transmission device via the wireless communication, wherein the first trailer driving status obtaining device and the trailer side transmission device are arranged on the first trailer, and wherein the towing vehicle side receiving device is arranged on the first vehicle.

4. The driving support system according to claim 1,
wherein the leading vehicle driving status obtaining device obtains the driving status of the second trailer-vehicle via inter-vehicle communication.

5. The driving support system according to claim 1,
wherein the second vehicle side communication device further includes a direction change determination device configured to determine a start time and a completion time of a direction change of the second trailer-vehicle, and wherein the second vehicle side transmission device transmits, at one time, the driving status of the second vehicle and the driving status of the second trailer that are obtained from the start time to the completion time by the second towing vehicle driving status obtaining device and the second trailer driving status obtaining device, respectively.

6. The driving support system according to claim 1,
wherein the second vehicle side transmission device successively transmits the driving status of the second vehicle and the driving status of the second trailer that are successively obtained by the second towing vehicle driving status obtaining device and the second trailer driving status obtaining device, respectively.

7. The driving support system according to claim 3, further comprising:
- a go-straight determination device configured to determine whether the first trailer-vehicle goes straight, and wherein the trailer side transmission device does not transmit the driving status of the first trailer when the go-straight determination device determines that the first trailer-vehicle goes straight.

8. The driving support system according to claim 3,
wherein the trailer side transmission device has a transmission output power that is set to be a minimum value for receiving the driving status of the first trailer by the towing vehicle side receiving device.

* * * * *